United States Patent [19]

Wrasman

[11] 4,038,358
[45] July 26, 1977

[54] METHOD OF MAKING A VALVE

[76] Inventor: Thomas J. Wrasman, 12500 Ridge Road, Louisville, Ky. 40223

[21] Appl. No.: 635,256

[22] Filed: Nov. 25, 1975

[51] Int. Cl.² .............................................. B29D 3/00
[52] U.S. Cl. .................... 264/242; 264/263; 264/278; 29/157.1 R; 251/315
[58] Field of Search ............... 29/157.1 R, 434, 527.1, 29/446; 264/242, 264, 277, 278, 263; 251/315, 364, 359

[56] References Cited

U.S. PATENT DOCUMENTS

| | | | |
|---|---|---|---|
| 2,066,658 | 1/1937 | Street | 29/157.1 R |
| 2,221,921 | 11/1940 | Le Beau, Jr. | 29/157.1 R |
| 2,387,013 | 10/1945 | Fuller | 29/157.1 R |
| 3,271,845 | 9/1966 | Breher | 29/157.1 R |
| 3,712,584 | 1/1973 | Wise et al. | 251/315 |
| 3,732,606 | 5/1973 | de Germond | 29/527.1 |
| 3,961,770 | 6/1976 | Wrasman | 29/157.1 R |

Primary Examiner—C.W. Lanham
Assistant Examiner—Daniel C. Crane
Attorney, Agent, or Firm—Fitch, Even, Tabin & Luedeka

[57] ABSTRACT

A valve includes a central valve component with an integral housing molded therearound. During the molding of the housing a seal is held against the valve component by spaced fingers of a tool. After molding is complete and the tool is withdrawn, plastic gripping fingers formed from plastic injected between the fingers of the tool during molding hold the seal against the valve component and the housing.

9 Claims, 6 Drawing Figures

METHOD OF MAKING A VALVE

This invention relates generally to fluid control valves and more specifically to valves and methods and tools for making valves which include an integral plastic housing molded about a preformed valve component or plug portion that regulates flow through the valve.

Plastic molded valves of the type described have historically suffered from leakage between the preformed valve component and the housing, especially when constructed without special seals, and efforts to prevent leakage have made construction of such valves more complicated and difficult, adding to the cost of the finished product. In particular, the rigid plastic which most valve housings are made of does not in itself usually provide a good seal with the valve component. Because it is not very elastic, it is subject to scratching, scarring or excessive wear from particulate matter that may be carried by the liquid which flows through the valve and which may work its way between the housing and the valve component after repeated opening and closing of the valve. Rigid plastic is also subject to possible shrinkage during cooling, which may prevent the formation of a good seal with the valve component, as well as to a phenomenon called creep or cold flow which is a slow deformation or movement of plastic when it is subjected to external forces. Even if a tight seal is initially formed between the housing itself and the valve component, creep resulting from internal fluid pressure on the housing may cause a separation of the housing from the component and a breaking of the seal after some time has passed.

Some inventors have attempted to overcome these problems by providing a soft, elastomeric seal between the valve component and the housing. However present techniques have not always provided a satisfactory means for holding the seal sufficiently tightly against the valve component to withstand the high injection velocities which occur during molding and which may dislodge a seal that is not firmly held in place. In addition, present techniques have often required numerous steps or procedures and sometimes additional materials for the molding operation.

Another deficiency which present valves are known to experience is leakage along the valve stem which extends from the valve component or plug portion through the housing. Again, the housing may not be sufficiently tight against the valve stem to provide a tight seal or the housing may become scratched by particulate matter. In such cases, even though a downstream seal may prevent leakage through the valve, the presence of liquid under pressure around the valve component may cause leakage along the stem portion which extends through the housing. To correct this problem, seals have been provided which are secured about the valve stem after the molding operation is completed. However, this has usually required additional parts or further operations after molding, which of course increases the cost of manufacture.

For example, in U.S. Pat. No. 3,271,845 to Breher, prefabricated rigid retaining bushings are used to hold an elastomeric seal against the valve component during molding. These bushings, which are actually molded into the valve body, cannot be reused. Another example involves U.S. Pat. No. 3,712,584 to Wise and Galt, which discloses a valve having only a plastic-to-plastic seal, the inventors depending on raised surfaces and upstream pressure to force the valve component against the housing.

Accordingly, it is an object of the present invention to provide an improved flow control valve which does not suffer from the deficiencies of valves heretofore made. Another object of the present invention is to provide a valve which utilizes elastomeric seals but which may be quickly and inexpensively produced without complicated procedures and with a minimum of parts.

These and other objects and advantages of the invention are particularly set forth in the following detailed description, and in the accompanying drawings, of which:

Figure 1:
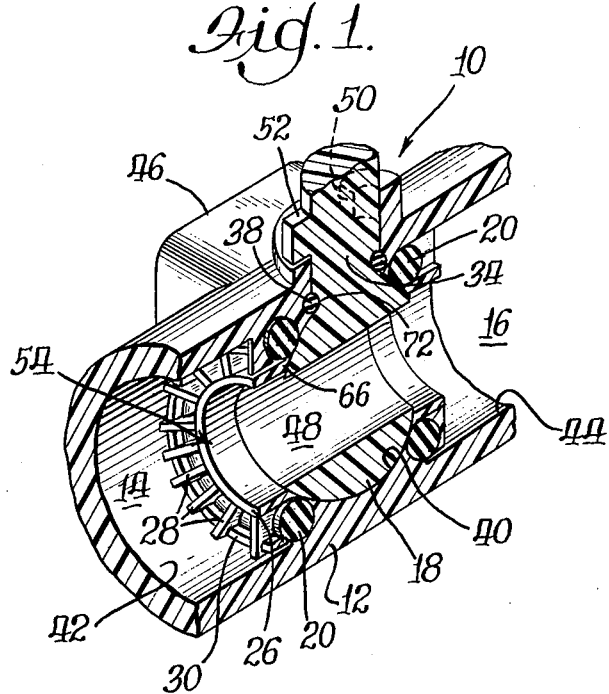
FIG. 1 is an isometric view, partially in section, of a valve embodying the present invention.

The present invention is generally embodied in a novel fluid control valve 10 and the method and tools for making the same. The valve includes an integrally molded housing 12 with an inlet 14 and an outlet 16, and a central valve component 18 within the housing which is movable between an open position which allows flow between the inlet and the outlet and a closed position which blocks such flow.

In accordance with the present invention, an improved valve 10 with increased resistance to leakage is fabricated by first clamping an elastomeric seal 20 against the valve component 18 with spaced gripping fingers 22 of a tool 24. The spaced fingers hold the seal securely against the valve component during molding of the housing 12. After molding is complete and the tool is withdrawn, the seal is held in intimate contact with the valve component by a retaining ring 26, a plurality of retaining fingers 28 and a stop ring 30 which were formed by plastic injected into the finger spaces during molding.

A valve stem 34 and handle 36 (best shown in FIGS. 5 and 6) may also be provided integrally with the valve component so as to extend through the housing and to provide a means for rotating the valve component between the open and closed positions. A seal 38 may also be provided on the valve stem and the housing molded therearound to prevent any leakage from the valve along the stem.

Turning now to a more detailed consideration of the drawings, which illustrate the present invention in its preferred embodiments and are not intended as a limitation of the invention to those particular features shown, the invention is generally embodied in a flow control valve which has the integral housing 12 molded about the preformed valve component or plug portion 18. Preferably, the housing is constructed of a glass fiber reinforced, acetyl copolymer resin such as that available under the tradename Celcon, from Celanese Plastics Co., but any moldable plastic resin or other moldable material may be used which has sufficient strength and rigidity to withstand the pressures and dynamic forces of the flow.

More particularly, the housing is generally cylindrical, with the inlet 14 and the outlet 16 at opposite ends. A central channel portion of the housing which encloses the valve component 18 is defined by a surface 40 which corresponds to the exterior surface of the component and communicates with the inlet and outlet via the bores 42 and 44, respectively, to allow flow through the valve when the component is turned to the open position. The inlet and outlet bores are cylindrical except for a slight outward taper for easy withdrawal of the tools that are used to form them after molding is complete.

Figure 6:
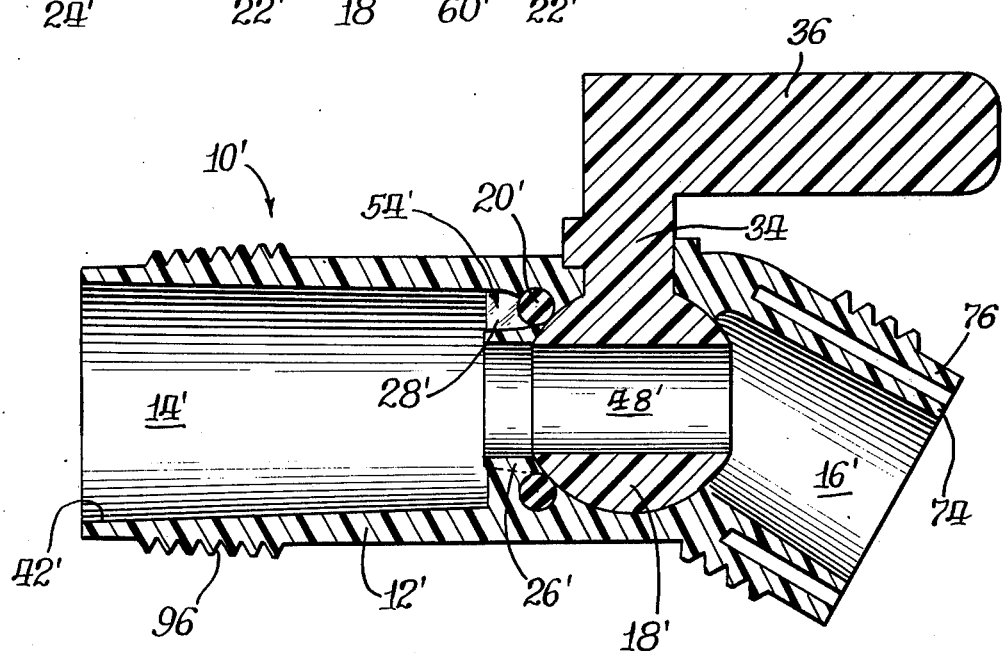
FIG. 6 is a vertical cross-sectional view of another embodiment of a valve utilizing the present invention.

As shown in FIG. 6, the housing is preferably threaded for the attachment of fittings or pipes, and as in FIG. 1, raised flat surfaces 46 are provided on opposite sides of the valve to accomodate the use of wrenches, pliers or automatic equipment during installation or removal.

To provide a means of allowing or blocking flow between the inlet and the outlet, the valve component 18 is movably secured within the center channel of the housing 12. The valve component is preformed, before the molding operation, and is preferably constructed of a phenylene oxide-based resin such as that available under the tradename Noryl from General Electric Co., which is relatively inexpensive, although it may also be fabricated from rigid plastics, metals or other materials which have sufficient strength. The preferred embodiment of the present invention, illustrated in FIG. 1, is a ball valve i.e. the valve component or plug portion is generally spherical or ball-shaped. A passageway 48 extends generally horizontally through the valve component, as illustrated, from one hemisphere to the opposite hemisphere. In this manner, the valve component can be rotated into a communicating alignment with the center channel so as to allow flow between the inlet 14 and the outlet 16 or rotated such that the bore 48 is substantially perpendicular to the inlet and outlet and flow is blocked.

The preformed valve component 18 may also include the internal valve stem 34 with the handle 36 for rotating the valve component between open and closed positions. Two stop surfaces, one of which is indicated at 50, are spaced around the valve stem and cooperate with the valve stem tab 52 to limit the allowable rotation of the valve component to a 90° sweep between the fully open position and the fully closed position. This allows the valve to be moved directly and without hesitation to either an open or closed position. The valve handle is attached so that when it is generally aligned with the valve housing, the valve component is in an open position, and when the handle is substantially transverse to the housing, the valve component is in a closed position.

To prevent leakage between the inlet 14 and the outlet 16 when the valve is closed, the seal 20 is secured against the valve component 18 and the housing 12. In the preferred embodiment shown, the seal is a nitrile rubber O-ring that is sufficiently soft and elastic to prevent or minimize leakage even after repeated rotation of the valve component. Materials other than nitrile rubber may also be used for O-ring construction if they are sufficiently resilient and elastic to provide a sealing relationship after repeated rotation. Seals may be included both upstream, i.e., the inlet side, and downstream, i.e., the outlet side, of the valve component to provide a supplemental or dual sealing arrangement.

In the preferred embodiment of the present invention, a retainer portion, indicated generally at 54, sandwiches the seal 20 against the housing 12 and the valve component 18 after the molding is completed. The compressive force on the seal by the retainer portion cooperates with the spherical shape of the valve component to retain the seal in a circumferentially stretched and cross-sectionally compressed position, thereby inducing resilient tension and compressive forces in the seal which help draw and force the seal into more intimate contact with the surface of the valve component. Preferably, the retainer portion is integral with the housing and is formed of plastic inserted between the fingers 22 of the tool 24 during the molding operation. It includes the retaining ring 26 which has a bearing portion that inscribes the seal and abuts the valve component to prevent inward slippage of the seal, integrally molded retaining fingers 28 which extend radially inwardly from the surface of the bore 42 to the retaining ring and the stop ring 30 extending between the retaining fingers and adjacent the side of the O-ring to hold the seal in intimate contact with the housing and the valve component.

Figure 3:
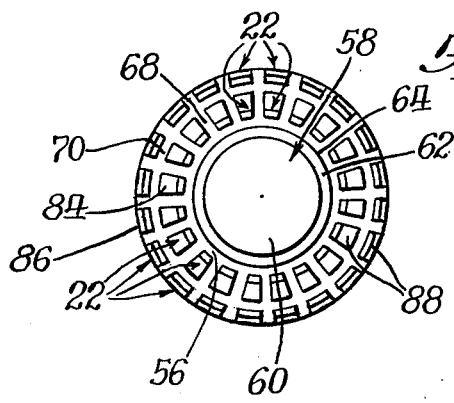
FIG. 3 is an end view of the tool shown in FIG. 2.
Figure 2:
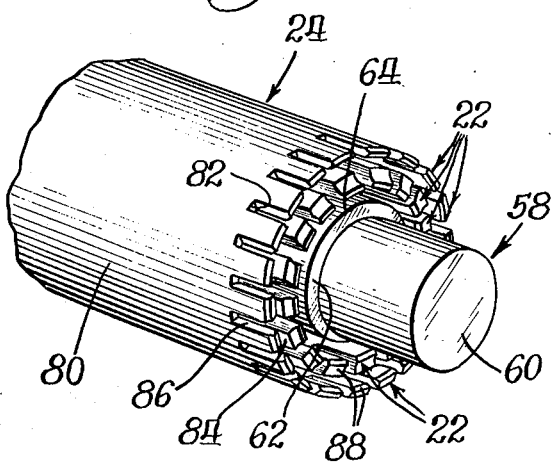
FIG. 2 is an isometric view of a tool embodying the present invention which is used during the molding of the valve shown in FIG. 1.
Figure 5:
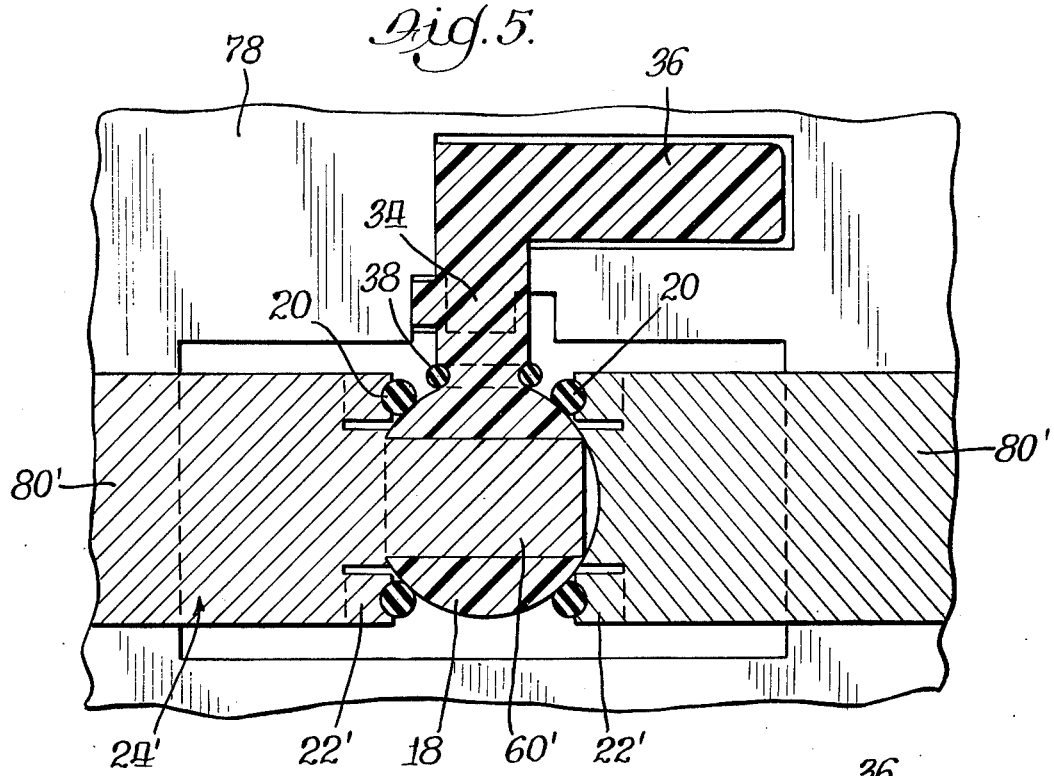
FIG. 5 is a sectional view of a valve component with the tool shown in FIG. 4, resting in a mold half.

More particularly, and referring to FIGS. 1-3, the retaining ring 26 is formed of plastic injected during the molding operation into a space 56 of the tool 24 which separates the gripping fingers 22 from a stepped cylindrical insert 58. While the gripping fingers hold the seal 20 against the valve component 18, a first portion 60 of the insert protrudes into the bore 48 of the component to hold it in alignment, and a lip 62 defined between the first portion and a larger base portion 64 of the insert abuts the edge of the bore 48 to seal it against clogging during molding. The retaining ring 26 is thus formed about the cylindrical base 64 and is generally circular and of slightly larger diameter than the bore of the valve component. It is also generally coaxial with the valve component bore when the component is in the fully open position, the position in which the molding occurs, as is shown in FIG. 5.

The retaining ring 26 includes a bearing portion 66 which inscribes the seal 20 and abuts the valve component 18 to prevent inward lippage of the seal and to hole it in a stretched relationship over the spherical surface of the component. The retaining fingers 28 are attached along that portion of the retaining ring not inscribing the seal to hold the ring in place relative to the housing.

The retaining fingers 28 are generally flat, splinelike elements spaced around the retaining ring 26 and extending radially inward from the surface of the bore 42 to the retaining ring with which they are integrally molded. The retaining fingers are produced during molding by plastic injected into spaces 68 between adjacent pie-shaped gripping fingers 22 of the tool 24. The gripping fingers 22 of the tool hold the O-ring seal 20 tightly against the valve component 18 during molding, the retaining fingers 28 help hold the seal against the component after molding is complete and the tool is removed.

To further assure a good seal between the O-ring 20 and the valve component 18, the retainer portion 54 includes the stop ring 30 which extends between adjacent retaining fingers 28 to provide a side abutment along the complete length of the O-ring, and to prevent serious relaxation of the O-ring between adjacent retaining fingers after the tool 24 is withdrawn. As is the case with the retaining fingers and retaining ring, the stop ring is also integrally formed during the molding operation. In particular, it is generated by injecting plastic into the circumferential slots 70 provided in the tool gripping fingers 22.

It is understood that valve leakage often occurs around the outside of the seal 20, that is, between the seal and the housing 12. To help in also preventing this kind of leak, the stop ring 30 is located radially nearer to the surface of the bore 42 than to the retaining ring 26 so that the area defined by the stop ring, the adjacent retaining fingers 28 and the retaining ring is substantially larger than the area defined by the stop ring, the adjacent retaining fingers and the surface of the bore 42. When the seal is on the upstream of the valve component, this geometry exposes more interior area of the O-ring to fluid pressure which acts to compress the O-ring upwardly against the housing and thereby compliments the pressure of the retaining fingers to assure a uniform seal around the O-ring.

To minimize leakage, the seal 20 should be maintained securely and intimately against the valve component 18 both during and after molding. The dimensions of the gripping fingers 22 and the retaining fingers 28 in the preferred embodiment cooperate with the stop ring 30 to provide a good seal between the O-ring and the valve component at all times. During molding, the gripping fingers hold the O-ring against the valve component. In the space 68 between adjacent gripping fingers there is no structure to brace the seal against the component, and if these spaces are too wide, only the resilient forces of the seal will be available to maintain it in intimate contact with the valve component, thus increasing the possibility of leakage in those areas. Preferably therefore, the gap between adjacent gripping fingers is sufficiently small that the compressive force against the O-ring by the gripping fingers is also transmitted to the portions of the O-ring extending between fingers, providing a generally uniform compression of the seal.

However, a small space 68 between adjacent gripping fingers 22 results in wide space between adjacent retaining fingers 28. To prevent relaxation of the O-ring 20 between the retaining fingers, which may cause leakage, the gripping fingers are circumferentially slotted 70 so that the stop ring 30 is formed during molding. The stop ring extends between adjacent retaining fingers and provides an abutment against the side of the O-ring along its entire length, thus preventing any weakening of the seal between the O-ring and the valve component 18 and the housing 12.

The valve stem 34 may also be sealed to prevent leakage from the housing 12, complimenting the upstream seal and providing additional sealing protection. In the preferred embodiment, the seal 38 is an elastomeric O-ring stretched over the valve stem and secured in a matching groove 72 in the stem. The groove 72 has a depth approximately equal to one-half the cross-sectional diameter of the O-ring and is located sufficiently low on the stem so that molten plastic completely encloses the exposed side of the O-ring when the housing is molded. This formed in place assembly eliminates the need for subsequent or additional parts or operations to install a valve stem seal.

Figure 4:
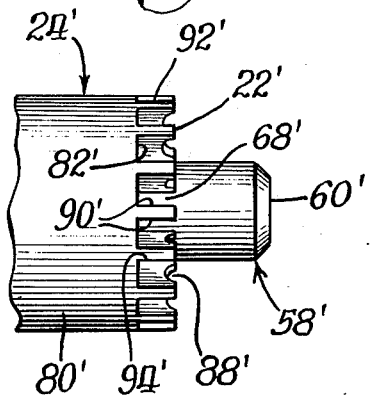
FIG. 4 is a side view of another embodiment of the tool utilizing the present invention.

Another embodiment of the present valve, showing additional features of the invention, is illustrated in FIGS. 4 and 6. FIG. 6 shows a valve 10' having an integral housing 12' molded about a central valve component 18'. The housing includes an outlet 16' disposed at an angle with the inlet 14', and a single upstream O-ring seal 20' is secured against the housing and the valve component by a retainer portion 54'. This valve is particularly applicable as a drain valve or spigot, directing the water downward and away from the appliance to which it is attached.

The retainer portion 54' includes a retaining ring 26' which inscribes the seal 20' to prevent slippage and which is fabricated in the same manner as described in respect to the embodiment shown in FIG. 1. The retaining fingers 28' are generally pie-shaped and extend from the surface of the bore 42' to the retaining ring to hold the seal 20' intimately against the housing 12' and the valve component 18'.

The retaining fingers 28' are formed during the molding process by plastic injected into the spaces 68' between adjacent gripping finers 22' of the alternative tool 24'. The gripping fingers 22' are generally flat and plate-like, resulting in pie-shaped retaining fingers 28', as compared to the pie-shaped gripping fingers 22 in the preferred embodiment which result in generally flat retaining fingers.

Because there is no stop ring in this embodiment, the gripping fingers 22' and the retaining fingers 28' are of the proper circumferential width to hold the O-ring 20' securely against the valve component 18' during and after molding respectively. To provide this kind of seal, the spaces between the respective fingers should be sufficiently small that the compressive force against the O-ring by the particular fingers is also transmitted to the portions of the O-ring between fingers, thus providing a generally uniform compression of the O-ring. Although the dimensions may vary depending on the size of the valve and the particular application, an average circumferential width for gripping fingers and retaining fingers of roughly one-half the O-ring cross-sectional diameter has been used in this embodiment of the present invention.

In the alternative embodiment shown in FIG. 6, the outlet 16' of the housing 12' includes two concentric wall portions, an interior wall portion 74 and an exterior wall portion 76 spaced from the interior wall portion. The space or slot between the wall portions allows the valve to cool and solidify faster after molding. It is also believed that the reduced diameter of the outlet bore which corresponds to the bore 48' of the valve component 18' provides a less turbulent and more laminar flow through the valve outlet.

The flow control valve described herein is preferably fabricated by injection molding. The mold 78 is illustrated in FIG. 5. It includes relieved surfaces, not shown, according to the desired exterior features of the valve. In the embodiment illustrated in FIG. 6, for example, the mold would include surface configurations for molding threaded portions 96, or other attachment configurations for mounting the valve, onto the inlet and outlet and may also, in the present invention, include configurations for molding flat raised surfaces on opposite sides of the valve, as described earlier, to accommodate the use of wrenches or similar tools for installation.

In molding the present valve, one of the first steps is to provide a preformed valve component 18. If it is made of plastic, it may be preformed by a plastic molding operation and, if it is constructed of metal, it may be preformed by machining or stamping. The seals 20 and the valve stem seal 38 are also preformed of a suitable elastomeric material. Before the molding operation actually occurs, and in the event a valve stem seal is used, it must be secured within the groove 72 of the stem 34 and the seals 20 are mounted upon the gripping fingers 22 of a tool 24 for insuring that they are held tightly against the valve component during the molding operation.

FIGS. 2 and 3 illustrate the preferred tool 24 that is used in the molding operation. The tool includes an enlarged shank or core portion 80 of generally cylindrical shape that forms the inlet or outlet bore and is preferably slightly tapered to facilitate easy removal. One tool is used for each of the inlet and outlet bores of the valve. The tool further includes the stepped cylindrical insert 58 which extends from the center of the end of the shank 80. The insert may be fabricated integrally with the shank or otherwise secured to the shank, as by threaded attachment (not shown), and includes a first portion 60 which may be inserted into the bore 48 of the valve component to assure proper alignment relative to the mold 78 during the injection of plastic and a lip 62 between the first portion and the wider base portion 64 to seal the bore 48 against clogging by molten plastic.

In the preferred embodiment, the insert 58 is of generally smaller diameter than the core 80 and a flat shoulder surface 82 is defined between them. The pie-shaped gripping fingers 22 extend axially from the shoulder surface and extend radially from the insert 58, as spokes on a wheel. Each gripping finger has two parts, an inner part 84 and an outer part 86 spaced from each other by the circumferential slot 70 and from adjacent fingers by the slot or space 68. The inner part of each finger is also separated from the insert 58 by the space 56. As described earlier, plastic injected into these spaces and slots form stop ring 30, the retaining fingers 28 and the retaining ring 26 which hold the seal 20 in place after molding is complete. The ends of the gripping fingers also have concave recesses 88 of approximately the same curvature as an uncompressed O-ring seal 20 and of sufficient depth to receive the elastomeric O-ring.

In the alternative embodiment illustrated in FIG. 4, the gripping fingers 22' also extend axially from the shoulder surface 82' and extend radially from the insert 58' as spokes on a wheel. But the alternative, the gripping fingers 22' are generally plate-like and have parallel sides 90', an outside edge 92' and an inside edge 94'. The space 56' separates the inside edge from the insert and the pie-shaped space 68' separates adjacent gripping fingers. These are similarly filled with plastic during molding to form the retaining ring 26' and the retaining fingers 28'.

During the molding operation, the gripping fingers 22 hold the seal 20 in intimate contact with the valve component 18. As noted earlier, in the preferred embodiment, the spaces between adjacent gripping fingers are sufficiently small that the seal is cross-sectionally compressed tightly against the valve component in a generally uniform manner around the O-ring. This is in addition to the tension forces induced from the circumferential stretching of the O-ring over the spherical surface of the component, which tension forces draw the seal into tighter contact with the valve component. It should be noted that the gripping fingers of the tool could also be constructed to effect a reduction of O-ring diameter if such were desirable in a particular application of the present invention.

In the molding operation, liquid or molten plastic fills the spaces around the gripping fingers 22 to form the retaining ring 26, retaining fingers 28 and stop ring 30 which do not merely hold the O-ring 20 against the housing 12 and the component 18, but maintain it in a compressed and stretched relationship with the valve component. The same is also true for the alternative embodiment which does not include a stop ring but has generally wider retaining fingers 28'.

In molding a valve embodying the present invention, the O-ring 20 is placed on the gripping fingers 22 of the tool 24. If a seal is desired both upstream and downstream, two tools are required. If only an upstream seal is desired, a tool like that in FIG. 2 but without gripping fingers would be utilized on the downstream side. The insert 58 of each tool is snugly fitted into the bore 48 of the valve component 18 to align the component relative to the mold, and the lip 62 abuts the component to prevent molten or liquid plastic from entering the bore and clogging it during the molding operation. Because the rubber O-ring must be pressed firmly against the valve component to assure a good seal during the molding operation, the insert 58 of the tool must not abut the facing tool, although it is not necessary for each tool to include an insert so long as the component 18 is properly aligned.

The assembly of the valve component 18, tool 24 and seals 20 and 38 are secured within the mold 78 which is shown in FIG. 5 with the alternative embodiment of the tool 24'. In a manner well known in the art of injection molding, molten plastic is injected into the mold to form the housing about the seals and the valve components. The pressure of injection must be sufficient to force plastic into the space between the gripping fingers of the tool, thus forming the plastic retaining fingers 28 retaining ring 26 and stop ring 30 which will hold the seal 20 in intimate contact with the valve component and the molded housing 12. After the housing has sufficiently cooled, the tools may be withdrawn and the valve may be removed from the mold. The particular sequence of molding steps is not critical in producing the present invention, but depends more particularly on the peculiar construction of each mold. To prevent plastic from adhering to the surface of the tools or the valve component these may be coated with a silicone spray or other lubricant.

It may thus be seen that in accordance with the present invention, a flow control valve that minimizes leakage may be easily constructed by molding an integral plastic housing 12 about a central valve component or plug portion 18. The elastomeric seal 20 is held in a sealing relationship with the housing and the valve component by the plastic retaining fingers 28, stop ring 30 and retaining ring 26 which are intergal with the housing and are formed during the molding process, but without complicated or costly procedures or materials. On the upstream side, the alternating retaining fingers also allow fluid pressure to assist in providing a good seal. Various modifications include the single upstream seal, the inclusion of a stem seal as well as downstream seals to fit specific uses and applications.

It should be understood that while preferred embodiments of the present invention have been described herein, various modifications, alternatives and substitutions will become apparent to those skilled in the art and, accordingly, the scope of the present invention shall be defined only by the appended claims and equivalents thereof.

Various features of the present invention are set forth in the following claims.

What is claimed is:

1. A process for molding an integral housing about a preformed valve component to form a completed valve comprising the steps of;

providing a preformed valve component having a passageway therethrough and a preformed annular elastomeric seal adapted for sealable engagement with said preformed valve component;

securing said seal firmly against said preformed valve component with a seal tool having a plurality of spaced fingers for applying pressure at a plurality of spaced locations around the circumference of said seal;

providing blocking means for substantially blocking said passageway against the entrance of molten plastic during molding;

providing core means for forming inlet and outlet bores on each side of said valve component;

inserting said valve component, seal means, seal tool, blocking means and core means into a mold having relieved surfaces corresponding to the desired exterior shape of the housing;

molding said housing with a suitable plastic material about said valve component, seal means, seal tool, blocking means and core means during which time said fingers firmly hold said sealing means against said component;

removing said seal tool, blocking means and core means after the plastic housing is hardened, and removing the completed valve from said mold, said plastic material between said spaced fingers holding said sealing means intimately against said component after said tool has been removed.

2. A process in accordance with claim 1 wherein said preformed seal is an elastomeric O-ring.

3. A process in accordance with claim 2 wherein said O-ring is located upstream of said valve component.

4. A process in accordance with claim 1 wherein said preformed valve component is generally spherical.

5. A process in accordance with claim 4 wherein said preformed valve component includes an integral valve stem and handle.

6. A process in accordance with claim 1 wherein said relieved surfaces of said mold include a portion for molding raised flat surfaces on the exterior of said housing.

7. A process in accordance with claim 5 wherein said valve stem includes a stop surface and wherein said relieved surfaces of said mold include portions for molding stop surfaces on said housing cooperable with the stop surface on said valve stem to limit the movement of said valve stem through a predetermined arc.

8. A process in accordance with claim 1 wherein said plastic material forms a retainer portion to hold said sealing means intimately against said component, said retainer portion including a retainer ring concentrically interior of and adjacent to said O-ring and a plurality of spaced retaining fingers adjacent said O-ring, said fingers extending radially inward to said retainer ring.

9. A process in accordance with claim 5 in which an O-ring seal circumscribes said stem and is in intimate sealing contact therewith.

* * * * *